(12) United States Patent
Meyer

(10) Patent No.: US 6,344,147 B1
(45) Date of Patent: Feb. 5, 2002

(54) FLOTATION PLANT

(75) Inventor: Udo Meyer, Baden (AT)

(73) Assignee: Aquaconsult Anlagenbau GmbH, Baden (AT)

( * ) Notice: Subject to any disclaimer, the term of this patent is extended or adjusted under 35 U.S.C. 154(b) by 0 days.

(21) Appl. No.: 09/553,799

(22) Filed: Apr. 21, 2000

(30) Foreign Application Priority Data

Apr. 28, 1999 (AU) ............................................. 756/99

(51) Int. Cl.$^7$ ................................ C02F 1/24; B01F 3/04
(52) U.S. Cl. .................... 210/703; 210/706; 210/221.2; 261/122.2
(58) Field of Search ...................... 209/170; 210/221.2; 210/703, 706; 261/122.2

(56) References Cited

U.S. PATENT DOCUMENTS

| | | | |
|---|---|---|---|
| 1,319,646 A | * | 10/1919 | Eccleston |
| 1,343,123 A | * | 6/1920 | Gahl et al. |
| 1,642,051 A | * | 9/1927 | Wall |
| 1,731,779 A | * | 10/1929 | Houston |
| 1,759,983 A | * | 5/1930 | Houston |
| 5,160,620 A | * | 11/1992 | Lygren |
| 5,458,771 A | * | 10/1995 | Todd |

FOREIGN PATENT DOCUMENTS

| | | | |
|---|---|---|---|
| DE | 2656477 | | 3/1978 |
| DE | 2709711 | * | 9/1978 |
| DE | 3441731 | | 5/1986 |
| DE | 8629601 | | 4/1987 |
| DE | 3613665 | | 10/1987 |
| DE | 4240300 | | 6/1994 |
| EP | 0250316 | | 12/1987 |
| GB | 712170 | * | 7/1954 |
| WO | 9535156 | | 12/1995 |
| WO | 97/02080 | * | 1/1997 |

* cited by examiner

Primary Examiner—Thomas M. Lithgow
(74) Attorney, Agent, or Firm—Ladas & Parry

(57) ABSTRACT

A flotation plant comprises air supply means with which air bubbles can be supplied to a basin to which untreated water is supplied so as to cause flakes suspended in the untreated water to float by aid of the air bubbles; the air supply means includes strip- or plate-shaped aeration means having perforated membranes and to be installed in the bottom region of said basin.

20 Claims, 3 Drawing Sheets

FLOTATION PLANT

FIELD OF THE INVENTION

The invention relates to a flotation plant having an air supply means with which air bubbles can be supplied to untreated water supplied to a basin so as to cause floating of flakes suspended in said untreated water by aid of the air bubbles.

BRIEF DESCRIPTION OF BACKGROUND ART

Flotation plants in particular operate according to the principle of direct or air flotation, wherein the known direct flotation plants are not very effective since so far only relatively large air bubbles can be produced and delivered to the untreated water. Therefore, the tendency is to use a so-called pressure release flotation which today is used almost everywhere. To dissolve the air amount required, in pressure release flotation, the air is enriched in water and released at a release valve. In a neighboring mixing zone, the partial flow saturated with air is then mixed with untreated water, whereby air bubbles form. As a rule, this mixing zone is not very large, and frequently coalescing of air bubbles occurs there. This in turn results in large air bubbles with the consequence of a reduced efficiency of the flotation plant. Apart from this, this pressure release flotation has the disadvantage that the air bubble introduction can only be effected from the mixing zone, which also reduces the efficiency of the plant.

From DE 26 56 477 A, a flotation arrangement is known in which a gas-permeable fabric mat is used above a bottom depression so as to attain aeration of the liquid contained. However, such fabric mats can yield only relatively large air bubbles, commonly in a size order of 5 mm, so that this embodiment is not suitable for, e.g., separating activated sludge in sewage treatment plants. Moreover, cleaning of the fabric mats is relatively complex.

In EP 250 316 A, a flotation arrangement is described which comprises several compartments, a aeration means, usually ceramic aeration plate means, being provided in a middle diffusion section, whereas in the neighbouring flotation compartment proper no separate aeration means is arranged. In the middle compartment, aeration has to be effected with high speed so as to force the gas, or the air, respectively, downwards and sidewards to the flotation compartments proper. This results in high pressure losses, and the efficiency of this arrangement is relatively low. In this arrangement, primarily a mixing of the gas and water phases is sought, a flotation effect rather being a side-effect thereof. Accordingly, the suspended matter in this arrangement is not moved upwards to the surface of the liquid but is collected on the bottom after having sunk down.

Furthermore, an arrangement for treating slurry water, in particular for separating lacquer sludge, is known from DE 86 29 601 U. For a gas treatment, a porous, non-elastic solid plate is inserted at the entry side of a pressurized air container in this instance. For gas treatment, a high pressure is required; nevertheless, in such porous gas treatment plates, the risk of clogging is high.

Finally, from DE 36 13 665 A a light-liquid separator comprising a reaction compartment is known in which supply ducts for supplying small air bubbles into the liquid are arranged. Here, the air addition mainly is effected for discharging detergents contained in the liquid; this known separator is, however, not suitable to separate supended matter, i.e. substances having a density higher than that of the liquid. In such suspended matter, the natural sedimentation movement must be changed into an upward movement for which purpose so far commonly the so-called pressure release flotation has been used, as has already been mentioned.

SUMMARY OF THE INVENTION

It is thus an object of the invention to solve these problems and to provide a flotation plant in which the effect of flotation is improved by simple means.

It is a further object of the invention to provide a flotation plant where an improved introduction of air bubbles into the untreated water is obtained, and also a coalescing of air bubbles is prevented at least mainly.

DESCRIPTION OF PREFERRED EMBODIMENTS

In the flotation plant according to the invention, the air supply means comprise strip- or plate-like membrane aeration devices for installation in the bottom region and including perforated membranes. In this manner, in the present flotation plant, means known per se are used for introducing air bubbles into the untreated water, i.e. Soto-called strip- or plate-aeration means or diffusers wherein a flexible membrane is mounted over a plate under tension, and is provided with a corresponding number of holes to allow the passage of air under formation of bubbles. Such diffusors are already being used in aeration basins, cf. e.g. WO 95/35156, yet in aeration basins different specific air loads are present as compared to flotation plants. There, e.g., a specific air load is used which is higher by a factor 100 or more as compared to flotation plants, yet for usual aeration purposes also larger air bubbles are delivered: as a rule, the typical diameter of the air bubbles in these conventional diffusers is some mm, e.g. 2 to 3 mm. In the case of flotation plants, however, the air bubbles should, if possible, merely be in the range of a few tenths of a mm, e.g. have a mean size (i.e. a mean diameter) of 0.5 mm.

With strip or plate diffusers, with a corresponding size of air bubbles and a corresponding number of openings or holes in the membranes, substantially better results can be obtained as compared to conventional air and pressure release flotations. By an adapted selection of size and number of the holes, the membranes allow for a wide range of regulation for the introduction of air bubbles, depending on the special use of the flotation plant, specific air loads of, e.g., 0.1 to 5 $Nm^3/hm^2$ being possible. With such a specific air load, the flotation plant can be operated at parameters corresponding to those which commonly are found in pressure release flotations; in particular, the rising speed in the flotation compartment may, e.g., be 2 to 10 $m^3/hm^2$ and the air/suspended matter ratio may be in the range of from 0.01 to 0.05 $Nm^3/kgDS$ (DS-dry substance). The suspended matter content (DS) in the untreated water may, e.g., be from 100 to 20,000 mg/l.

A further advantage of the use of the membrane diffusors mentioned in the flotation plant is that under the given specific air load, also coalescing of air bubbles can be avoided. This is also aided by the fact that the introduction of air can occur distributed over the entire flotation space, which, moreover, enhances the degree of effectiveness when the particles distributed in the liquid float, as well as the enrichment of these particles on the liquid surface, in the flotate layer.

If the operational parameters allow it, it is also very much conceivable to equip the flotation space only partially with the membrane aeration means mentioned. For a particularly efficient flotation it is, however, suitable if substantially the entire bottom of the flotation plant is equipped with aeration means.

To generate fine air bubbles, preferably with a mean diameter of 0.5 mm, generally 0.1 to 0.9 mm, the membrane must have correspondingly small holes, and for this it has proven suitable if the membranes are membranes perforated by micro-needles.

To attain the suitable specific air load in the above-indicated range required for this flotation, it is furthermore advantageous when providing appropriately small holes if the number of holes is from 10 to 100 per cm$^2$ of membrane surface.

The membrane aeration means according to the invention are simple and can be produced, mounted and operated at low cost, and, in principle, they may be constructed in a manner known per se. In this connection, reference is also made to DE 34 41 731 A or to DE 42 40 300 A in addition to the afore-mentioned WO 95/35156 A.

The membranes may simply be made of synthetic material, such as a polycondensate or a polyaddition product. Preferably, the membranes may be made of polyurethane, EPDM, silicone, Viton, polyethylene-trifluoride or polycarbonate. Of course, also other synthetic materials are conceivable, as long as they have the appropriate strength and can be perforated by micro-needles. During such perforation, preferably micro-needles having a diameter of from 0.1 to 1 mm are used, the holes thereby formed in the membranes being practically closed in the unpressurized state of the membranes and opening only at an overpressure, e.g. of from 30 to 80 mbar, on the one side (where the air is supplied).

The invention will now be explained in more detail by way of preferred exemplary embodiments and with reference to the drawings.

DESCRIPTION OF THE PREFERRED EMBODIMENTS

Figure 1:
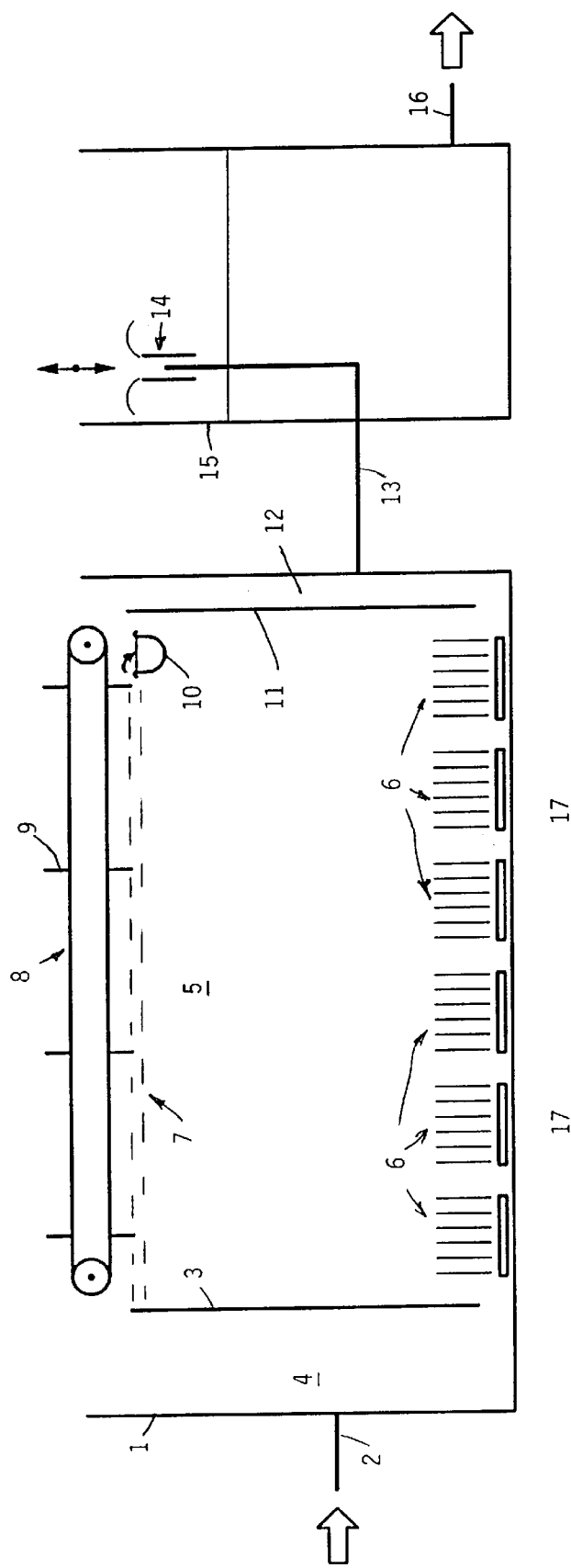
FIG. 1 schematically shows a flotation plant in a vertical section.

In FIG. 1, a basin 1 is schematically illustrated to which untreated water is supplied from a preceding basin, in particular a flocculation basin (not illustrated), via a supply means 2. This untreated water first gets into a region 4 separated by a separating wall 3 from the remaining basin 1, from which it gets into the flotation region 5 proper by flowing in below the separating wall 3. In doing so, it is ensured that the untreated water is supplied in the bottom region from where the rising of flakes present therein is aided by air. In detail, air bubbles supplied in the bottom region of the basin 1 which are schematically indicated in FIG. 1 by vertical lines at 6 cause the flakes in the untreated water (which, e.g., have previously been formed in the flocculation basin in the untreated water) to float, thereby forming a flotate layer 7 in the upper zone of basin 1; this layer being schematically represented in FIG. 1. The flotate 7 then is removed in cycles or continuously, for which purpose, e.g., a clearing device 8 acting like a conveying means may be provided which conveys the flotate by aid of shovels 9 into a sludge channel 10. From this channel 10, the sludge is then removed in conventional manner not illustrated in detail.

On the right-hand side of the basin 1 in FIG. 1, a clean-water withdrawal zone 12 which is again separated from the remaining basin by a separating wall 11 is provided; and clean water is guided therefrom via a duct 13 to a height-adjustable clean-water overflow means 14 regulating the clean-water level and located in a separate basin or basin region 15, from which the clean water is withdrawn at 16. The overflow means 14 is of per se conventional construction, also as regards its vertical displacement, which is merely schematically indicated by a vertical double arrow in FIG. 1; a detailed description thereof thus is not required.

What is essential for the present flotation plant is the use of plate- or strip-aeration means 17 arranged in the bottom region of floating basin 1, which aeration means or diffusers are designed to deliver fine air bubbles of a size in the order of from 0.1 to 0.9 mm, preferably with a mean diameter of 0.5 mm, into the liquid. Such aeration means 17 are as such known from aeration basins, yet there they are differently dimensioned for other air passages and other air bubble sizes, wherein, in particular, air bubbles in a size of the order of a few mm diameter are delivered. On the other hand, the present flotation plant has a fine perforation of the membranes of the aeration means 17 by punching with micro-needles, and on the whole also the air passage in the present flotation plant is less than in case of an aeration basin.

Figure 3:
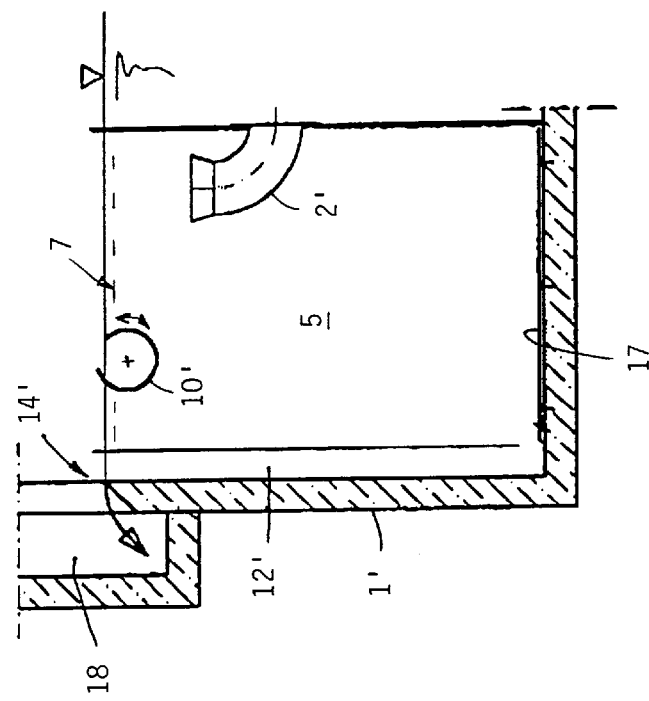
FIG. 3 shows a schematic cross-section through this flotation plant according to line III—III of FIG. 2.
Figure 2:
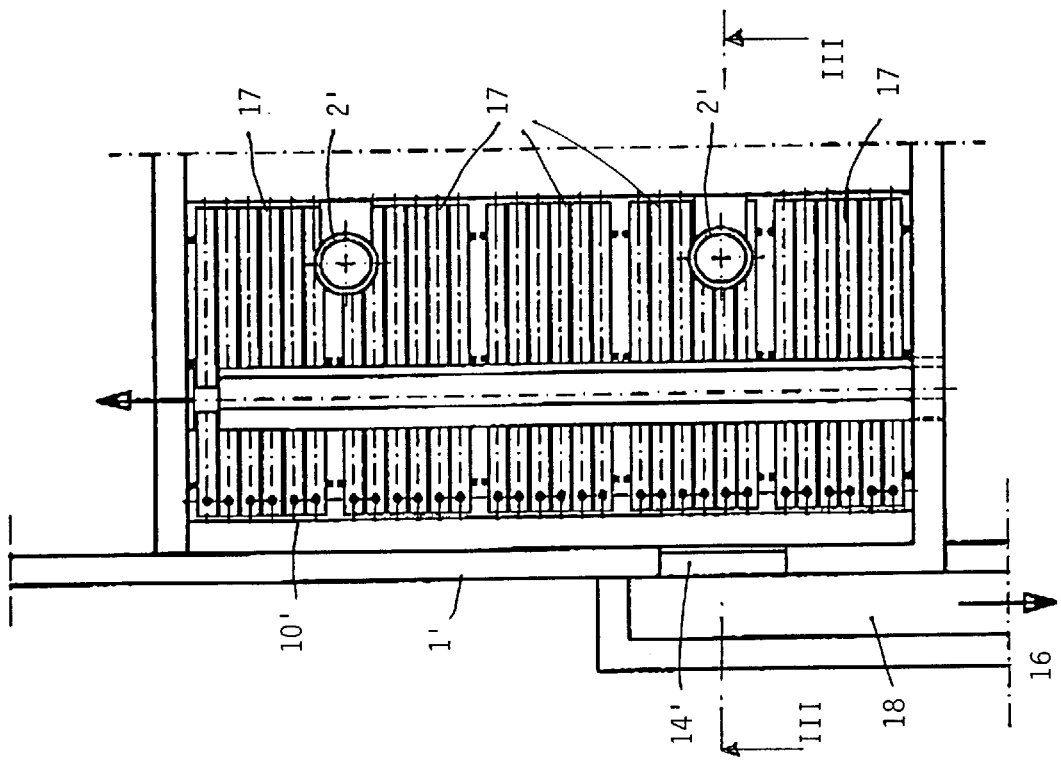
FIG. 2 shows a somewhat modified flotation plant in a schematic top view.
Figure 4:
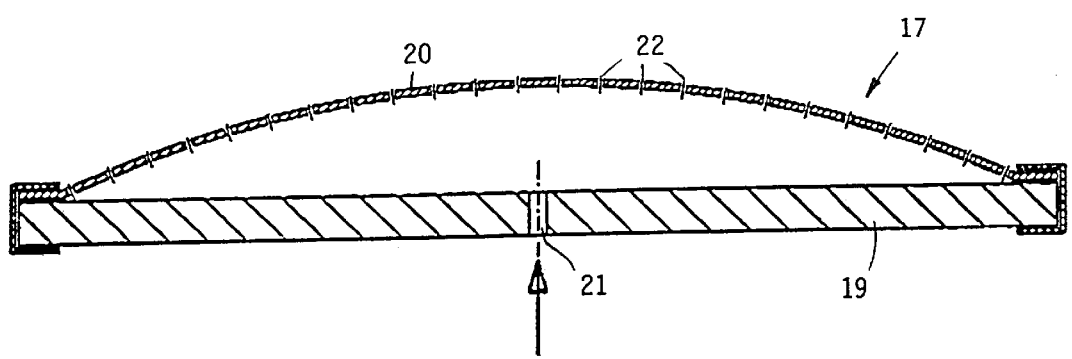
FIG. 4 shows a schematic cross-section through a plate- or strip-aeration means used in such a flotation plant according to FIGS. 1 to 3.

Before explaining by way of FIG. 4 the basic construction of such an aeration means 17 comprising a perforated membrane, it should first be referred to a somewhat modified flotation plant with reference to FIGS. 2 and 3, it being visible from FIG. 2 that practically the entire bottom of the flotation basin 1 may be covered with aeration means 17 of the type of construction indicated.

In detail, in the flotation basin 1' partially illustrated in FIGS. 2 and 3, an untreated water supply 2' comprising upwardly bent tubes is provided. At the upper side of the flotation space 5, in this instance a sludge channel 10' rotatably mounted about a horizontal axis is located, and by pivoting this sludge channel the one rim over which the flotate 7 can flow thereinto, is selectively adjustable to a higher or lower level. From this sludge channel 10', the sludge is transported away again, cf. the arrow in the upper part of FIG. 2. In the flotation plant according to FIGS. 2 and 3, which is of smaller dimensions as compared to that of FIG. 1, thus a sludge removal device, such as the device 8 in FIG. 1, is not required.

In FIGS. 2 and 3 a clean water overflow from a clean water region 12' into a clean water drain channel 18 is illustrated at 14', from which the clean water is removed, as is schematically illustrated in FIG. 2 by an arrow at 16.

According to the top view of FIG. 2, the aeration means 17 are comprised in several—e.g. five—groups of several—e.g. six—strip-shaped diffusor means 17; the diffusor means 17 are supplied in groups with air in a manner known per se and not illustrated in detail via ducts, and they may also be removed and installed in groups.

A cross-section through such an aeration means 17 is schematically illustrated in FIG. 4, from which it can be seen that a membrane 20 is arranged above a strip-shaped or also broad plate 19, which membrane is fixed on the plate rim in conventional manner, e.g. by gluing, screws, clamps or the like, which is merely schematically illustrated in FIG. 4. Pressurized air is supplied to the space between the plate 19 and the membrane 20 from the lower side, through a bore 21 in the plate 19, it being, however, also conceivable to provide the pressurized air from the upper side, through the membrane 20, as is also already known per se (cf., e.g., WO 95/35156 A).

Membrane 20 is provided with holes 22 mechanically produced by punching or perforating, respectively, with micro-needles, these holes 22 being closed as a rule in the unpressurized state of the membrane 20, yet being opened when pressurized air is supplied, when the membrane 20 stretches and slightly bulges so that their size (diameter) is in the tenths of a mm range. Depending on the pressure applied, on the thickness of the membrane (which may, e.g, be from 0.1 to 1 mm, in particular from 0.1 to 0.5 mm), on the material of the membrane etc., fine air bubbles having a diameter in the size range of from 0.1 to 0.9 mm, in particular with a mean diameter of 0.5 mm, result when air passes through the holes 22. The micro-needles used for perforating the membranes 20 thus must be chosen according to this aim in dependence on the pressure of the air, on the membrane elasticity and membrane thickness, etc., which can be done rapidly by simple tests.

Preferably, the membrane is made of a synthetic material, in particular a polycondensate, or of a polyaddition product, such as, e.g., polyurethane, EPDM, silicone, Viton, PE-trifluoride or polycarbonate. Such materials allow for the fine holes mentioned before, and, on the other hand, have a high useful life, so that on the whole a low-cost, operationally economical and reliable flotation plant is obtained.

If the respective operational parameters allow so, it is, of course, also possible to cover only part of the bottom of the flotation basin 1, or 1', respectively, with aeration means 17, as described before.

It is, as such, preferred to introduce air bubbles distributed over the entire flotation space, whereby also an undesired coalescence of delivered air bubbles—which would lower the degree of effectiveness of the flotation plant—will be largely prevented. In this connection, preferably 10 to 100 holes 22 will be provided per cm² membrane area, with the holes 22 being very fine ones, as has been said before.

What is claimed is:

1. A flotation plant comprising a basin to receive untreated water having suspended matter therein, and further comprising air supply means for supplying air bubbles to the untreated water said air supply means including plate-shaped aeration means with perforated membranes for installation in a bottom region of said basin, wherein said membranes comprise perforations having a mean diameter of from 0.1 to 1 mm wherein said air bubbles cause said suspended matter to float.

2. A flotation plant according to claim 1, wherein said aeration means are strip-shaped.

3. A flotation plant according to claim 1, wherein substantially an entire bottom of said flotation plant is equipped with said membrane aeration means.

4. A flotation plant according to claim 1, wherein said perforated membranes have perforations punched by micro-needles.

5. A flotation plant according to claim 4, wherein the air bubbles have a mean diameter of 0.5 mm.

6. A flotation plant according to claim 1, wherein said membranes comprise 10 to 100 perforations per cm² of membrane area.

7. A flotation plant according to claim 1, wherein said membranes are made of a synthetic material.

8. A flotation plant according to claim 7, wherein the synthetic material of said membranes is selected from the group consisting of a polycondensate and a polyaddition product.

9. A flotation plant according to claim 7, wherein the synthetic material of said membrane is polyurethane.

10. A flotation plant according to claim 7, wherein the synthetic material of said membranes is EPDM.

11. A flotation plant according to claim 7, wherein the synthetic material of said membranes is silicone.

12. A flotation plant according to claim 7, wherein the synthetic material of said membranes is Viton.

13. A flotation plant according to claim 7, wherein the synthetic material of said membranes is PE-trifluoride.

14. A flotation plant according to claim 7, wherein the synthetic material of said membranes is polycarbonate.

15. A method for the treatment of water comprising the steps of:
(a) providing the flotation plant of claim 1,;
(b) treating the water by supplying the water into the basin of the flotation plant so that air bubbles from the air supply means of the flotation plant cause flakes in the water to form a flotate in an upper zone of the basin;
(c) removing the flotate; and
(d) withdrawing the treated water from the basin.

16. A method for the treatment of water comprising the steps of:
(a) providing the flotation plant of claim 2;
(b) treating the water by supplying the water into the basin of the flotation plant so that air bubbles from the air supply means of the flotation plant cause flakes in the water to form a flotate in an upper zone of the basin;
(c) removing the flotate; and
(d) withdrawing the treated water from the basin.

17. A method for the treatment of water comprising the steps of:
(a) providing the flotation plant of claim 3;
(b) treating the water by supplying the water into the basin of the flotation plant so that air bubbles from the air supply means of the flotation plant cause flakes in the water to form a flotate in an upper zone of the basin;
(c) removing the flotate; and
(d) withdrawing the treated water from the basin.

18. A method for the treatment of water comprising the steps of:
(a) providing the flotation plant of claim 5;
(b) treating the water by supplying the water into the basin of the flotation plant so that air bubbles from the air supply means of the flotation plant cause flakes in the water to form a flotate in an upper zone of the basin;
(c) removing the flotate; and
(d) withdrawing the treated water from the basin.

19. A method for the treatment of water comprising the steps of:
(a) providing the flotation plant of claim 6;
(b) treating the water by supplying the water into the basin of the flotation plant so that air bubbles from the air supply means of the flotation plant cause flakes in the water to form a flotate in an upper zone of the basin;

(c) removing the flotate; and
(d) withdrawing the treated water from the basin.

20. A method for the treatment of water comprising the steps of:
(a) providing the flotation plant of claim 8;
(b) treating the water by supplying the water into the basin of the flotation plant so that air bubbles from the air supply means of the flotation plant cause flakes in the water to form a flotate in an upper zone of the basin;
(c) removing the flotate; and
(d) withdrawing the treated water from the basin.

* * * * *